May 9, 1944.    A. SCHMIDT, JR., ET AL    2,348,652
ELECTRIC VALVE CONTROL CIRCUITS
Filed Nov. 5, 1941

Inventors:
August Schmidt, Jr.,
Carl C. Herskind,
by Harry E. Dunham
Their Attorney.

Patented May 9, 1944

2,348,652

UNITED STATES PATENT OFFICE 2,348,652

ELECTRIC VALVE CONTROL CIRCUIT

August Schmidt, Jr., Niskayuna, and Carl C. Herskind, Schenectady, N. Y., assignors to General Electric Company, a corporation of New York Application November 5, 1941, Serial No. 417,922

2 Claims. (Cl. 175—363)

Our invention relates to electric control circuits and more particularly to control or protective circuits for electric valve translating apparatus.

In accordance with the teachings of our invention described hereinafter, we provide new and improved control circuits for electric valve translating apparatus of the type employing an ionizable medium and comprising an immersion-ignitor type control member.

It is an object of our invention to provide new and improved electric valve circuits.

It is another object of our invention to provide new and improved control circuits for electric valve translating apparatus of the type employing immersion-ignitor control members.

It is a further object of our invention to provide new and improved protective circuits for electric valve translating apparatus of the type employing immersion-ignitor control members wherein the electric valve means is controlled in response to a predetermined electrical condition, such as arc-back of the electric valves, to render the electric valve means nonconducting, thereby suppressing the arc-back.

Briefly stated, in the illustrated embodiments of our invention we disclose new and improved arrangements for protecting electric valve means of the type which employ immersion-ignitor control members wherein the associated excitation circuit or the electric valve means itself is controlled in response to the occurrence of an arc-back condition to maintain the electric valve means nonconducting for a predetermined interval of time, thereby suppressing the arc-back condition and restoring the system to a condition suitable for normal operation.

Figure 1:
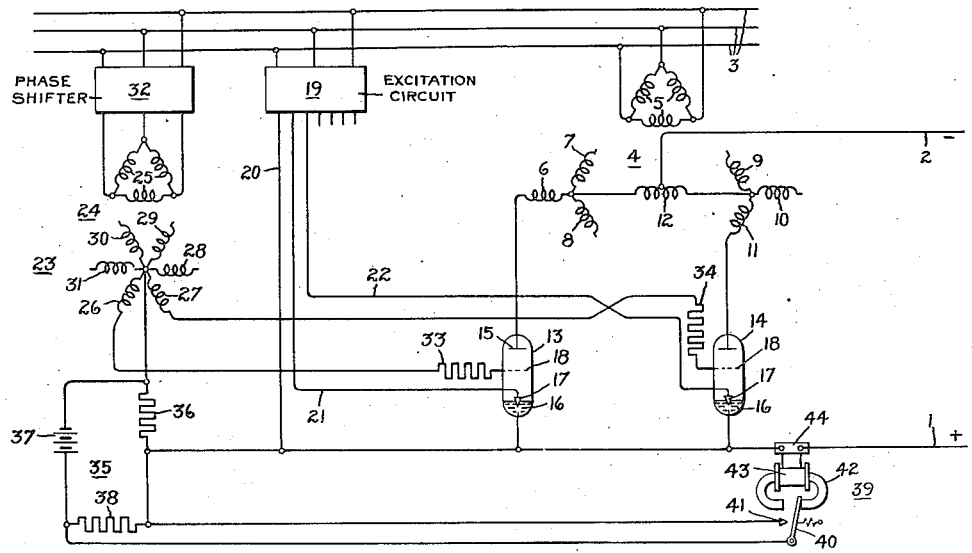
Figure 2:
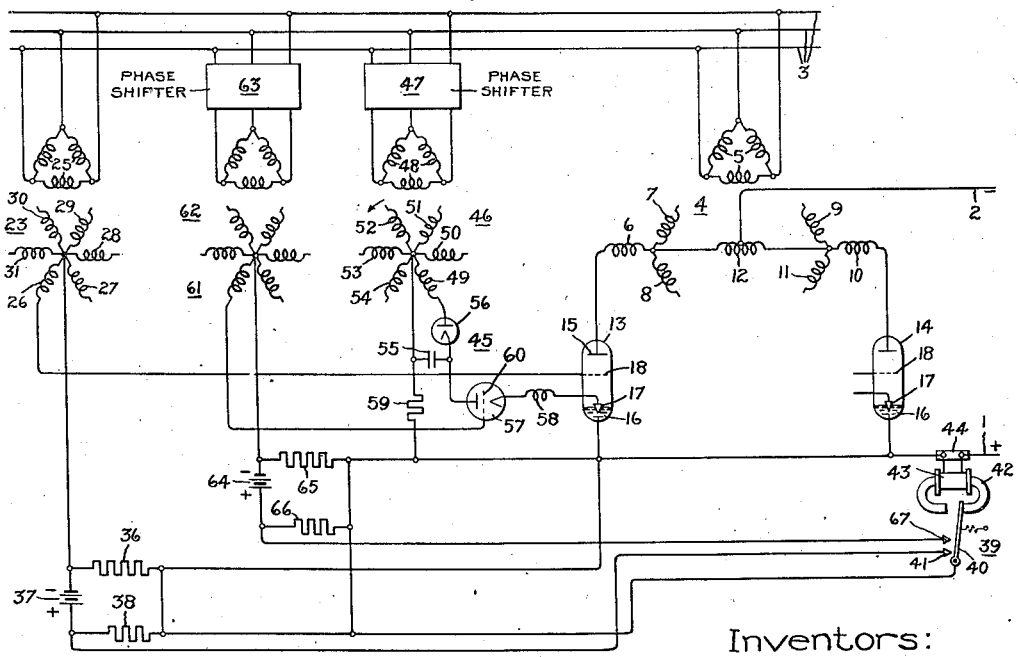

For a better understanding of our invention, reference may be had to the following description taken in connection with the accompanying drawing, and its scope will be pointed out in the appended claims. Fig. 1 diagrammatically illustrates an embodiment of our invention as applied to a control or protective system for an electric valve means of the immersion-ignitor type and which includes a control electrode which is variably energized to maintain the electric valve means nonconducting in the event an abnormal operating condition occurs; and Fig. 2 is a modification of the arrangement shown in Fig. 1.

Referring now to Fig. 1 of the accompanying drawing, an embodiment of our invention is diagrammatically illustrated as applied to a polyphase electric valve converting system, such as a polyphase rectifier, for supplying power to a direct current load circuit, including a positive conductor 1 and a negative conductor 2, from an alternating current supply circuit 3. The translating apparatus comprises an inductive network having a plurality of electrically displaced phase windings which may be provided by means of a transformer 4 having a plurality of primary windings 5 and two groups of electrically displaced phase windings 6, 7, 8, and 9, 10, 11. The secondary windings may be arranged in the conventional double-Y relationship wherein the neutral junctures of the two groups of phase windings are interconnected through a phase equalizing or interphase transformer 12 which is connected to the negative terminal 2 of the direct current load circuit.

Electric valve means is associated with each of the phase windings 6–11, inclusive, and are connected between the respective phase windings and the positive terminal of the direct current circuit. It is to be understood that electric valve means are associated with each of these windings, but for the purpose of illustrating our invention only electric valve means 13 and 14 associated with windings 6 and 11 are shown. The electric valve means 13 and 14 are preferably of the type employing an ionizable medium, such as a gas or a vapor, and each comprises an anode 15, a cathode of the self-reconstructing type such as a mercury pool cathode 16 and an immersion-ignitor type control member 17 which is associated or in contact with the cathode 16. The immersion-ignitor control members 17 are preferably constructed of a material such as boron carbide or silicon carbide, and which have an electrical resistivity relatively large compared with that of the mercury of the associated pool cathode. The electric valve means 13 and 14 are also provided with auxiliary control means or a control electrode 18 which serves, when properly energized, to accelerate the establishment of arc discharges between the cathodes 16 and the anodes 15 upon the establishment of cathode spots on cathodes 16 due to the proper energization of control members 17. The control electrodes 18 are also constructed and arranged so that if a suitable biasing potential is impressed thereon arc discharges will not be established between cathodes 16 and anodes 15 even though the cathode spots have been established on the associated cathodes 16 by the energization of immersion-ignitor control members 17. In other words, the control electrodes 18 serve as means for controlling the condition of conductivity of the electric valve means 13 and 14.

In order to supply to the immersion-ignitor control members 17 impulses of current for establishing arc discharges within the electric valve means 13 and 14 and thereby effecting ionization of the ionizable medium or mercury vapor, we employ an excitation circuit 19 which may be of any of the conventional arrangements now known in the art. The excitation circuit 19 may comprise a plurality of circuits each being of the type disclosed and claimed in U. S. Letters Patent No. 2,110,700 granted March 8, 1938, upon an application of Frank R. Elder and which is assigned to the assignee of the present application. The excitation circuit 19, of course, supplies a system of electrically displaced voltages of suitable wave form for energizing the control members 17 so that the electric valve means associated with windings 6–11, inclusive, conduct current in a predetermined order or sequence determined by the order of phase rotation of the system. The excitation circuit 19 is provided with a conductor 20 which is connected to the common cathode connections of the electric valves 13 and 14, and conductors 21 and 22 are connected to the control members 17 of electric valve means 13 and 14, respectively. Control members of the other electric valve means (not shown) associated with windings 7, 8 and 9, 10 are energized in a corresponding manner from the excitation circuit 19.

We provide a control circuit 23 which supplies to the control electrodes 18 of electric valve means 13 and 14 suitable control voltages which may be periodic or alternating and which have a predetermined phase relationship with respect to the anode-cathode voltages of the associated electric valve means. The excitation circuit 23 comprises a transformer 24 having a plurality of primary windings 25 and a plurality of electrically displaced secondary windings 26–31, inclusive. Secondary winding 26 is connected to control electrode 18 of electric valve means 13, and secondary winding 27 is connected to control electrode 18 of electric valve means 14. Suitable phase shifting means 32 may be employed between the transformer 24 and the alternating current circuit 3 to control or adjust the phase relation of the alternating voltages impressed on control electrodes 18. In this manner the potentials impressed on the control electrodes 18 may be controlled or adjusted to accelerate the establishment of arc discharges between the cathodes 16 and anodes 15 upon the establishment of cathode spots on the associated cathodes 16 due to the proper energization of immersion-igniter control members 17. Current limiting resistances 33 and 34 may be connected in series relation with the control electrodes 18 of electric valve means 13 and 14 respectively.

As a means for impressing on the control electrodes 18 a suitable hold-off voltage, such as a negative unidirectional biasing voltage, we provide a circuit 35 which may include a suitable impedance element which has a resistance 36 connected in circuit with the control electrodes 18, and this circuit may include the control means 23 or more particularly the secondary windings of transformer 24. In order to limit the magnitude of the negative biasing potential impressed on control electrodes 18 due to the flow of current through resistance 36 from battery 37, we employ a resistance 38 which is connected in series relation with resistance 36, and which is of a magnitude sufficient to maintain the negative biasing potential less than the critical value of voltage which when impressed on control electrodes 18 will prevent the transmission of arc discharges between the cathodes 16 and anodes 15.

To impress on the control electrodes 18 a negative unidirectional biasing potential or hold-off potential in response to a predetermined electrical condition of either the supply circuit or the load circuit, we provide means for short-circuiting or shunting the resistance 38, thereby effecting the transmission of an increased amount of unidirectional current through resistance 36 and thereby substantially increasing the magnitude of the negative unidirectional biasing potential to a value greater than the above described critical value so that arc discharges will not be propagated from the cathodes 16 to the anodes 15, even though cathode spots are initiated by the energization of control members 17.

We provide means responsive to an arc-back condition of electric valve means 13 and 14 for effecting application of the negative unidirectional biasing or hold-off voltage to the control electrodes 18 in response to an arc-back condition or phenomenon of an associated circuit occasioned by arc-back of the electric valve means. For the purpose of illustrating our invention, we employ a polarized current responsive means 39 which is connected to operate in response to the reversal of current flow in the load circuit occasioned by an arc-back of one or more of the electric valve means of the translating system. The current responsive means which is responsive to the direction of current flow comprises an armature 40 which is spring biased to the open circuit position away from contact 41, a polarized core member 42 and an actuating coil 43 which may be energized from a shunt 44 connected in the direct current load circuit. When the armature 40 engages contact 41, resistance 38 is shunted thereby effecting an increase in the magnitude of the biasing or hold-off voltage impressed on control electrodes 18.

The operation of the embodiment of our invention shown in Fig. 1 will be explained by considering the system when it is operating as a polyphase rectifier for supplying current to the direct current load circuit. It will be well understood by those skilled in the art, that the system operates as a double-three-phase system, the electric valve associated with each winding conducting current during 120 electrical degrees of the supply circuit voltage. The electric valves associated with the two groups of secondary windings operate in parallel, but each electric valve means in each group conducts current during only 60 electrical degrees with any one electric valve means in the other group. This phase equalization is, of course, accomplished by means of the interphase transformer.

Timed impulses of current, preferably unidirectional current, are transmitted to immersion-ignitor control members 17 from excitation circuit 19 to render the electric valve means conducting in a predetermined order. The phase shifter 32 is adjusted so that the alternating voltages provided by secondary windings 26–31, and which are impressed on control electrodes 18, serve to accelerate the transmission of the arc discharges from the cathodes 16 to the anodes 15 upon the proper energization of control members 17. The negative unidirectional biasing potential appearing across resistance 36 when relay 39 is deenergized, and when cooperating with the alternating voltages of secondary windings 26-31 is not sufficient to maintain the electric valve means 13 and 14 nonconducting and, consequently, unidirectional current is supplied to the load circuit. The voltages of the direct current circuit may be varied by controlling or adjusting the time of occurrence of the unidirectional impulses of current transmitted to control members 17 with respect to the applied anode-cathode voltages.

If an arc-back occurs on one or more of the electric valve means in the translating system, there is a reversal of current flow in the direct current circuit including conductors 1 and 2. Consequently, the current responsive means 39, which is responsive to the direction of current flow, will operate effecting engagement of armature 40 and contact 41, and thereby effectively short-circuiting resistance 38 to cause the transmission of an increased amount of unidirectional current through resistance 36. The biasing potential which is impressed on control electrodes 18 under this condition is sufficient to maintain the electric valve means 13 and 14 nonconducting, even though subsequent cathode spots are established on the cathodes 16 by the energization of control members 17.

Negative unidirectional biasing or hold-off voltage is impressed on control electrodes 18 so long as the arc-back condition exists, and will be automatically removed by the re-opening of the shunt circuit around resistance 38 when the reverse current condition no longer exists due to the clearance of the fault or arc-back condition.

Another embodiment of our invention which is illustrated in Fig. 2, is similar in many respects to that shown in Fig. 1, and corresponding elements have been assigned like reference numerals. In the arrangement of Fig. 2 we employ a plurality of excitation circuits for transmitting unidirectional impulses of current to the immersion-ignitor control members 17 of the electric valve means. Only excitation circuit 45 associated with electric valve means 13 is shown. This excitation circuit may be energized from the alternating current circuit 3 through a transformer 46 and a phase shifting device 47. Transformer 46 comprises a plurality of primary windings 48 and secondary windings 49-54 inclusive. Excitation circuit 45 is energized from winding 49. The other secondary windings may be employed as sources of current for energizing the excitation circuits of the electric valves associated with windings 7-11, inclusive. The excitation circuit 45 is of the type disclosed and claimed in the above-identified Patent No. 2,110,700 wherein a capacitance 55 is charged through a unidirectional conducting device 56 and is periodically discharged through an electric discharge device 57 and an inductance 58 to transmit an impulse of unidirectional current to control members 17. If desired, a resistance 59 may also be connected in the discharge circuit for capacitance 55. The electric discharge device 57 is preferably of the type employing an ionizable medium, such as a gas or vapor, and comprises a control grid 60.

In order to control the conductivity of the electric discharge device 57 and to render it periodically conducting at predetermined times during the cycle of voltage of the supply circuit 3, we employ a control circuit 61 which impresses on the grid 60 a periodic or an alternating voltage. The control circuit 61 may comprise a transformer 62 which may be energized from the supply circuit 3 through a phase shifter 63 so that the time at which the discharge device 57 is rendered conducting may be controlled throughout the cycle of voltage of the supply circuit 3. It will be understood that the secondary windings of transformer 62 are connected to the grids of corresponding electric discharge devices for the other power electric valve means.

In order to introduce into the excitation circuits for the discharge device 57 a unidirectional biasing potential, we employ a battery 64 which transmits a unidirectional current to resistance 65 and produces across its terminals a biasing potential. The times at which the discharge device 57 are rendered conducting are determined, of course, by the conjoint action of the bias appearing across resistance 65 and the voltage of the associated secondary winding of transformer 62.

We provide means for increasing the magnitude of the biasing potential impressed on the grid 60 of the electric discharge device 57 in response to a predetermined electrical condition of one of the associated circuits, such as a reverse current condition occasioned by arc-back. This means may comprise a resistance 66 which is connected in series relation with resistance 65 and connected to be short-circuited or shunted by means of contacts 67 of current relay 39. Upon reversal of power flow or current flow occasioned by arc-back, contacts 41 and 67 of the relay 39 are closed substantially simultaneously to effect application of negative or hold-off voltage to control electrodes 18 and the grids 60 of electric discharge device 57. In this manner the power electric valve means are rendered nonconducting and the excitation circuits are prevented from operating so that energizing impulses of current are not transmitted to the immersion-ignitor control members 17.

The operation of the embodiment of our invention illustrated in Fig. 2 is substantially the same during normal operation as that set forth above in connection with Fig. 1.

If an arc-back condition occurs, the current directional relay 39 will close its contacts 41 and 67 by movement of the armature 40 to effect application of negative or hold-off voltages to control electrodes 18 of power electric valve means 13 and 14, and will also effect the application of negative or hold-off voltage to the grid 60 of control electric discharge device 57. The application of the negative or hold-off voltage to the control electrodes 18 serves to suppress the arc discharges or arc-backs of the electric valve means, and the hold-off voltage impressed on grids 60 of electric discharge device 57 prevents operation of excitation circuit 45 so that energizing impulses of current are not transmitted to the immersion-ignitor control members 17 so long as the arc-back condition exists. As soon as the arc-back clears, the spring-biased armature 40 of relay 39 is moved to the right-hand position indicated in the drawing and the biasing potentials are automatically removed from control electrode 18 and grid 60. It is, of course, understood that instead of employing a current responsive relay which automatically opens its control and resets the system, we may employ within the scope of our invention a relay of the type which trips out upon the occurrence of the arc-back or reverse current condition. Furthermore, it will be appreciated that relay 39 may be arranged to open its contacts after a time delay period for effecting application of the negative or hold-off potentials for a predetermined interval of time, at the expiration of which the biasing potentials are removed to initiate normal operation of the electric valve system.

While we have shown and described our invention as applied to particular systems of connections and as embodying various devices diagrammatically shown, it will be obvious to those skilled in the art that changes and modifications may be made without departing from our invention and we therefore aim in the appended claims to cover all such changes and modifications as fall within the true spirit and scope of our invention.

What we claim as new and desire to secure by Letters Patent of the United States, is:

1. In combination, a polyphase alternating current circuit, a direct current circuit, electric translating apparatus connected between said circuits and comprising a plurality of electric valve means each including an anode, a cathode, an immersion-ignitor control member in contact with said cathode, and a control electrode, excitation means for transmitting impulses of current to said immersion-ignitor control members to render said electric valve means conducting periodically, means including a polyphase transformer for impressing an alternating current voltage on said control electrodes, an impedance element connected in circuit between the neutral connection of said polyphase transformer and a common connection between the cathodes of said electric valve means, a source of unidirectional voltage and a second impedance element connected in series across said first-mentioned impedance element, said source of voltage being poled to produce a voltage on said first-mentioned impedance element tending to render said electric valve means nonconductive, and means common to the cathodes of said plurality of electric valve means and responsive to an arc-back condition of said electric valve means for establishing a low impedance path in parallel with the second-mentioned impedance element to increase the magnitude of the negative voltage impressed on said first-mentioned impedance element.

2. In combination, an alternating current circuit, a direct current circuit, electric translating apparatus interconnecting said circuits and comprising electric valve means including an anode, a cathode, an immersion-ignitor control member in contact with said cathode, and a control electrode, excitation means for transmitting impulses of current to said immersion-ignitor control member to render said electric valve means conducting periodically and comprising an electric discharge device having a grid, control means connected to said grid for rendering said electric discharge device conducting periodically, an impedance element connected in circuit with said control grid and a second impedance element connected in circuit with said control electrode, a source of unidirectional voltage and an impedance element connected in shunt with each of said first two mentioned impedance elements, each said unidirectional voltage source being so poled as to impress a negative voltage component on said grid and said control electrode, and means common to the cathodes of said plurality of electric valve means and responsive to an arc-back condition of said electric valve means for establishing a low resistance circuit in shunt with each of said last two mentioned impedance elements to increase the voltage impressed on the impedance elements in circuit with said control electrode and said grid to maintain said valve means nonconducting.

AUGUST SCHMIDT, Jr.
CARL C. HERSKIND.